March 29, 1955

O. E. JERNER, SR 2,705,134

CONCRETE MIX CARRIER AND FEEDER

Filed July 13, 1953

INVENTOR
Oscar E. Jerner Sr.
BY
ATTYS

March 29, 1955 O. E. JERNER, SR 2,705,134
CONCRETE MIX CARRIER AND FEEDER
Filed July 13, 1953 5 Sheets-Sheet 5

INVENTOR
Oscar E. Jerner Sr.
BY
Webster & Webster
ATTYS

United States Patent Office 2,705,134
Patented Mar. 29, 1955

2,705,134

CONCRETE MIX CARRIER AND FEEDER

Oscar E. Jerner, Sr., Turlock, Calif.

Application July 13, 1953, Serial No. 367,580

4 Claims. (Cl. 259—160)

The present invention is directed to, and it is a major object to provide, a novel tractor-mounted, concrete mix carrier and feeder adapted to transport such mix from a mixer to a use-point, and at the latter to feed the mix to a form or the like.

Another important object of the instant invention is to provide a concrete mix carrier and feeder which is especially designed, but not limited, for use to transport concrete mix to adjacent a trench and to there feed such mix into a form in the trench which produces in-place concrete pipe therein; forms for such purpose being shown—for example—in my United States Letters Patent Nos. 2,574,213 and 2,620,634.

An additional object of the invention is to provide a concrete mix carrier and feeder which includes a novel vertically adjustable hopper adapted to receive the mix from the mixer in a relatively low position, and to feed said mix from a relatively elevated position; the hopper being movable by power up and down an elevator frame secured on the tractor, and said hopper including a motor-driven agitator whereby to maintain the mix in motion during transport.

A further object of this invention is to provide a concrete mix carrier and feeder which embodies an adjustable mix feeding chute, and novel mechanism operative to adjust the same; the chute being adjustable by said mechanism to different positions of lateral projection from the tractor, and independently adjustable up or down, both as working conditions may require.

A still further object of this invention is to provide a concrete mix carrier and feeder having novel mechanism to adjust the mix receiving, chute feeding spout out of the way of the hopper upon up or down travel of the latter, yet to position such spout beneath the outlet of the hopper—to receive mix therefrom—when said hopper is in raised position.

A separate object of the present invention is to provide a concrete mix carrier and feeder in which the raising and lowering of the hopper, together with the setting of the adjustable working parts of the device, is accomplished through the medium of a novel assembly of fluid pressure actuated power cylinders.

It is also an object of the invention to provide a concrete mix carrier and feeder which is sturdy in construction; positive in action; and designed for long and efficient service, with a minimum of maintenance.

Still another object of the invention is to provide a practical and reliable concrete mix carrier and feeder, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged fragmentary side elevation of the device, but with the hopper in its raised position; the view being partly broken away, and partly in section.

Figure 1:
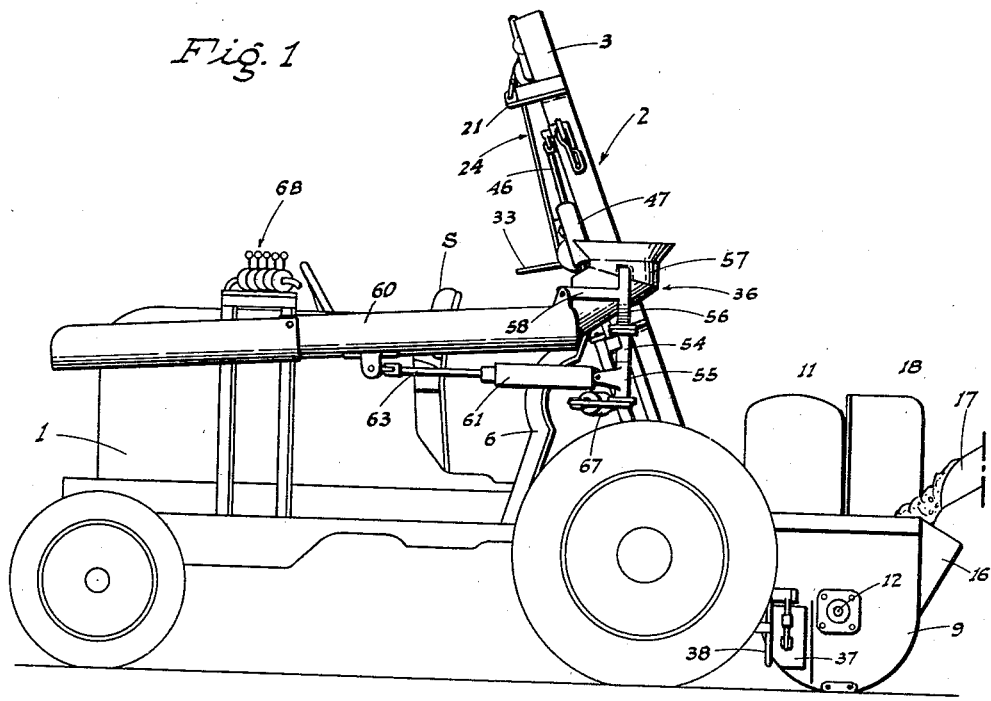
Fig. 1 is a side elevation of the device as mounted on a tractor; the hopper being shown in lowered, mix receiving position, while the feed chute is shown in its transport position alongside the tractor.
Figure 3:
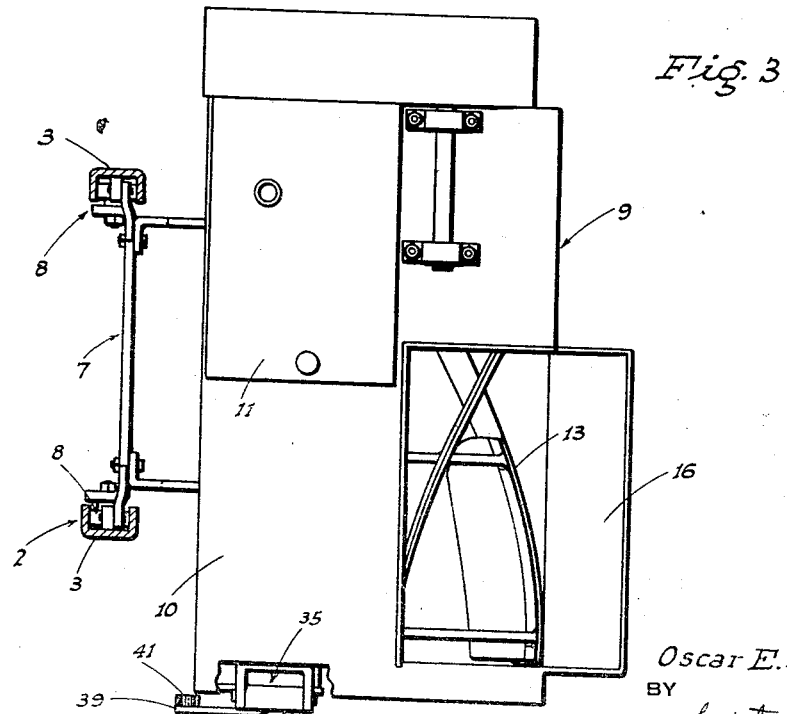
Fig. 3 is a plan view of the hopper and includes a showing of the connection with the side rails of the elevator frame; said rails being in section, and the remainder of the device being omitted.

Referring now more particularly to the drawings and the characters of reference marked thereon, the device comprises, at the rear of a wheel tractor 1, a forwardly and upwardly inclined elevator frame, indicated generally at 2; such elevator frame including upstanding, transversely spaced side rails 3 of inwardly facing channel form.

The elevator frame 2 terminates at its lower end adjacent but short of the ground, and is secured, adjacent the lower end, to the rear axle structure 4 of the tractor 1 by suitable attachment members 5.

The elevator frame 2 is further supported from the tractor by transversely spaced upstanding posts 6. Such elevator frame carries a vertically adjustable carriage 7 thereon; said carriage being fitted, top and bottom, with roller units 8 which run in guided relation in the inwardly facing channel shaped side rails 3.

A bin-like concrete mix receiving hopper 9 is disposed rearwardly of the carriage 7, being fixedly secured thereto for up and down travel therewith. On top thereof the hopper 9 is fitted with a deck 10, which deck supports an engine unit 11. Such engine unit drives the shaft 12 of a rotary agitator or auger 13 journaled in said hopper; the latter being round-bottomed for matching engagement with such auger. The driving connection between the engine shaft 14 and the shaft 12 comprises a speed reducing chain and sprocket system, indicated generally at 15. With this arrangement the auger 13 can be constantly engine-driven irrespective of the position of vertical adjustment of the hopper 9.

In offset relation to the engine unit 11, and generally toward the rear of the deck 10, there is a hopper opening 16 through which the mix is delivered from the chute 17 of a mixer into the hopper 9 when the latter is in its lowered position. See Fig. 1. A shield 18 upstands from the deck 10 about the forward edge and inner end of the hopper opening 16 to assure that the mix delivers properly downwardly through said hopper opening.

The carriage 7 is power actuated on the elevator frame 2, whereby to move the hopper 9 from its lowered mix-receiving position, as in Fig. 1, to its raised mix feeding position, as in Figs. 2 and 7, as follows:

An upstanding, heavy-duty, fluid pressure actuated power cylinder 19 is fixed centrally of the elevator frame 2, being secured at the lower end to a lower cross head 20, and at the upper end to a cross bar 21. The piston rod 22 of cylinder 19 projects upwardly, and is fitted with an upper cross head 23.

A pair of block and cable systems 24 extend between the cross heads 20 and 23; said cross heads carrying the lower sheaves 25 and the upper sheaves 26, respectively, of said block and tackle cable systems.

At one end the block and tackle cable systems 24 are anchored to the cross bar 21, as at 27, while the other ends are anchored to a cross bar 28 on the carriage 7. Thus, with operation of the power cylinder 19 to extend the piston rod 22, the cable systems 24 work to raise the elevator carriage 7 on the elevator frame 2; lowering of said carriage being accomplished by retraction of said piston rod 22.

When the carriage 7 reaches its fully raised position, it is automatically latched against downward motion, and so that the load on the power cylinder 19 may be relieved; such latching being accomplished by means of the following arrangement:

The hopper 9 is formed, on the back side and centrally of its ends, with a downwardly facing catch 29, and an upstanding catch bar 30 is pivoted at its lower end, as at 31, to a cross bar 32 included in the elevator frame 2.

A hand lever 33 is fixed in connection with, and projects forwardly from, the upstanding catch bar 30 intermediate its ends; the hand lever 33 being of such length that it extends to a point for ready manual access by the operator from the seat S on the tractor 1.

Figure 5:
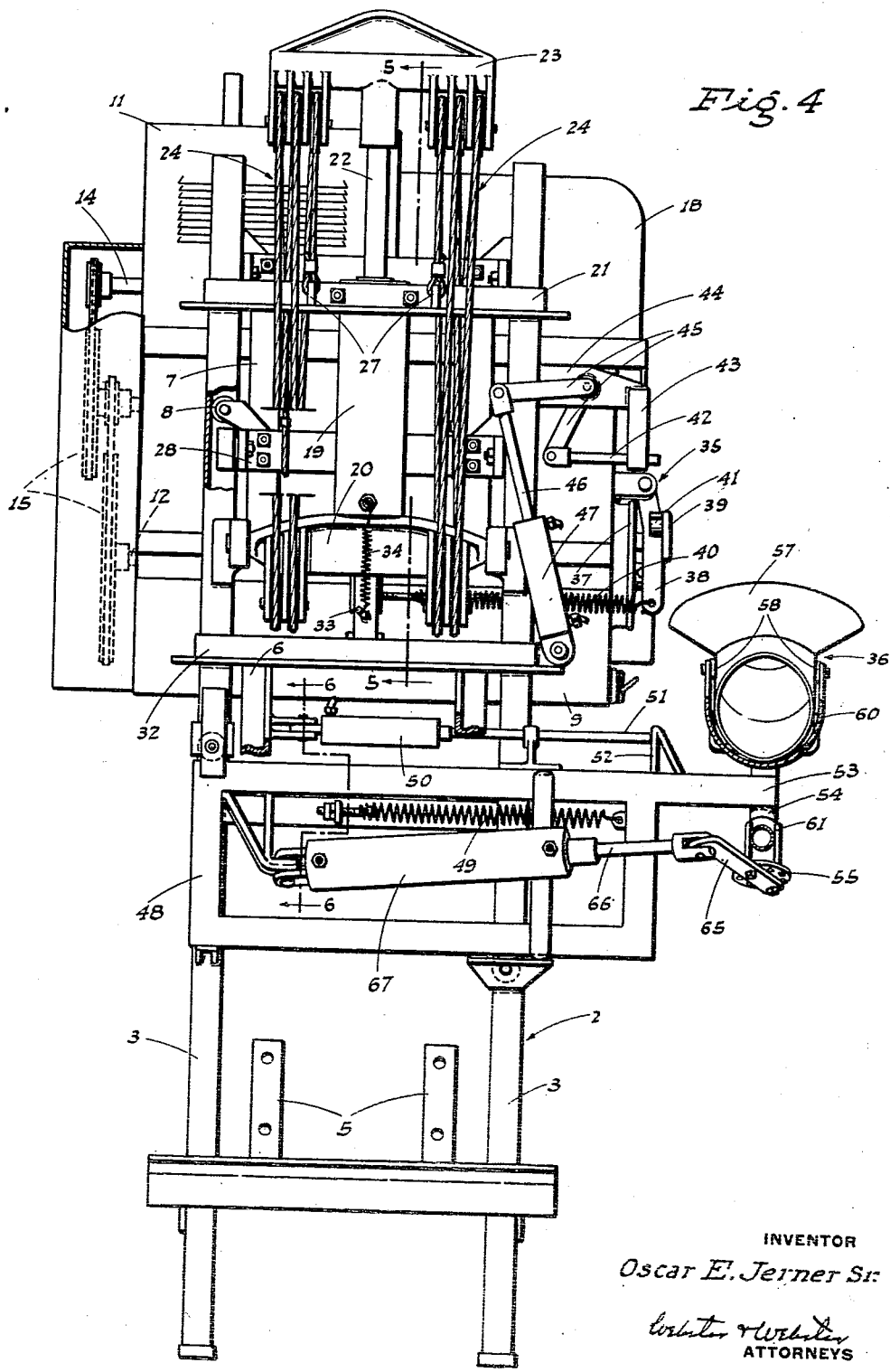
Fig. 5 is an enlarged fragmentary sectional elevation on line 5—5 of Fig. 4.
Figure 6:
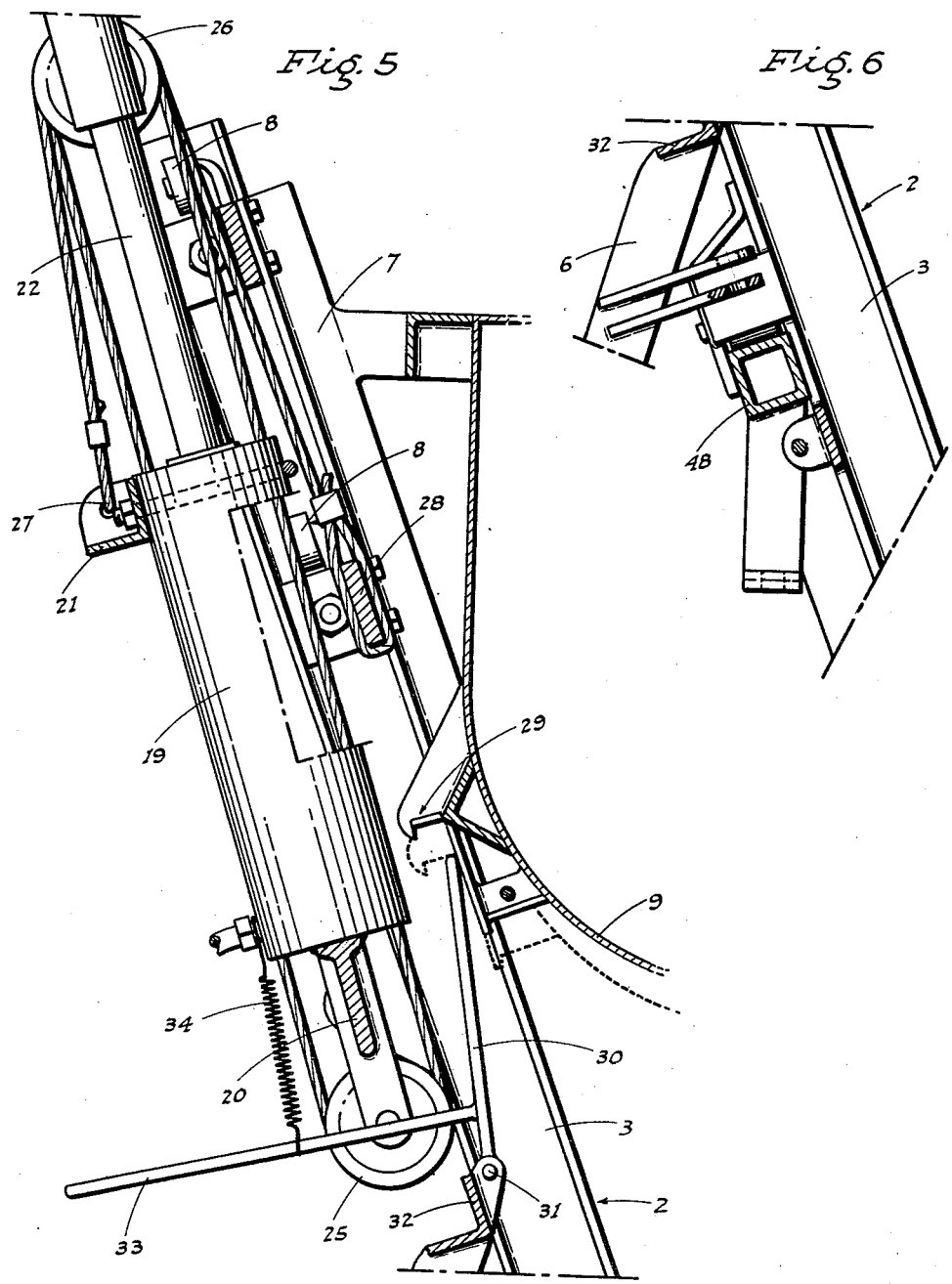
Fig. 6 is an enlarged fragmentary sectional elevation on line 6—6 of Fig. 4.

A tension spring 34 connects the hand lever 33 at an elevated point, normally urging said hand lever 33 upwardly, with resultant tendency of the upstanding catch bar 30 to swing rearwardly at its upper end. When the hopper 9 travels to its fully raised position, the upstanding catch bar 30 is first deflected forwardly by the catch 29 and then snaps below the latter. When this occurs, a slight lowering of the elevator frame 2 brings the catch 29 to abutment against the upper end of the catch bar 30, as shown in dotted lines in Fig. 5. This maintains the elevator frame 2 and hopper 9 positively in a raised position, and without reliance upon the power cylinder 19 or the cable systems 24.

The catch bar 30 remains in this position while the hopper 9 is being unloaded in the manner as will hereinafter appear, and when such unloading is completed the elevator frame 2 and hopper 9 are raised slightly by the power cylinder 19 and cable systems 24, whereupon the operator depresses the hand lever 32, swinging the catch bar 30 clear of the catch 29, so that said elevator frame 2 and hopper 9 may then run downward to the lowered loading position, as in Fig. 1.

When the hopper 9 is in its raised position it is unloaded, under the influence of the rotary auger 13, through a door assembly indicated generally at 35, and which is located in one end of the hopper; the concrete mix as unloaded through the door assembly 35 discharging into an adjustable chute assembly, indicated generally at 36.

The door assembly 35 comprises a door 37 which normally closes an opening in one end of the hopper 9; said door 37 being carried on a laterally outwardly swingable arm unit 38 which includes a rigid, forwardly projecting finger 39.

A tension spring 40 connected to the arm unit 38 normally maintains the door 37 closed.

At its outer end, and on the inner face, the finger 39 is formed with a concave, upwardly opening seat 41, and when the elevator carriage 7 and hopper 9 raise to unloading position, such seat picks up the outer end of a laterally outwardly projecting push rod 42 which is normally suspended, for limited vertical free-play relation, in a suspension yoke 43 fixed on and depending from a bracket part 44 on the elevator frame 2.

At its inner end the push rod 42 is pivoted to one end of a bellcrank lever 45 journaled on said bracket part 44, while the opposite end of said bellcrank lever 45 is pivotally connected to the upper end of a piston rod 46 of a fluid pressure actuated power cylinder 47 whose lower end is pivotally attached to the adjacent end of the cross bar 32.

With the elevator carriage 7 and hopper 9 in raised unloading position, and with the outer end of the push rod 42 engaged in the seat 41, the power cylinder 47 is operated in a direction to cause the push rod 42 to thrust outwardly, carrying the finger 39 and swingable arm unit 38 laterally outwardly, which opens the door 37.

Figure 4:
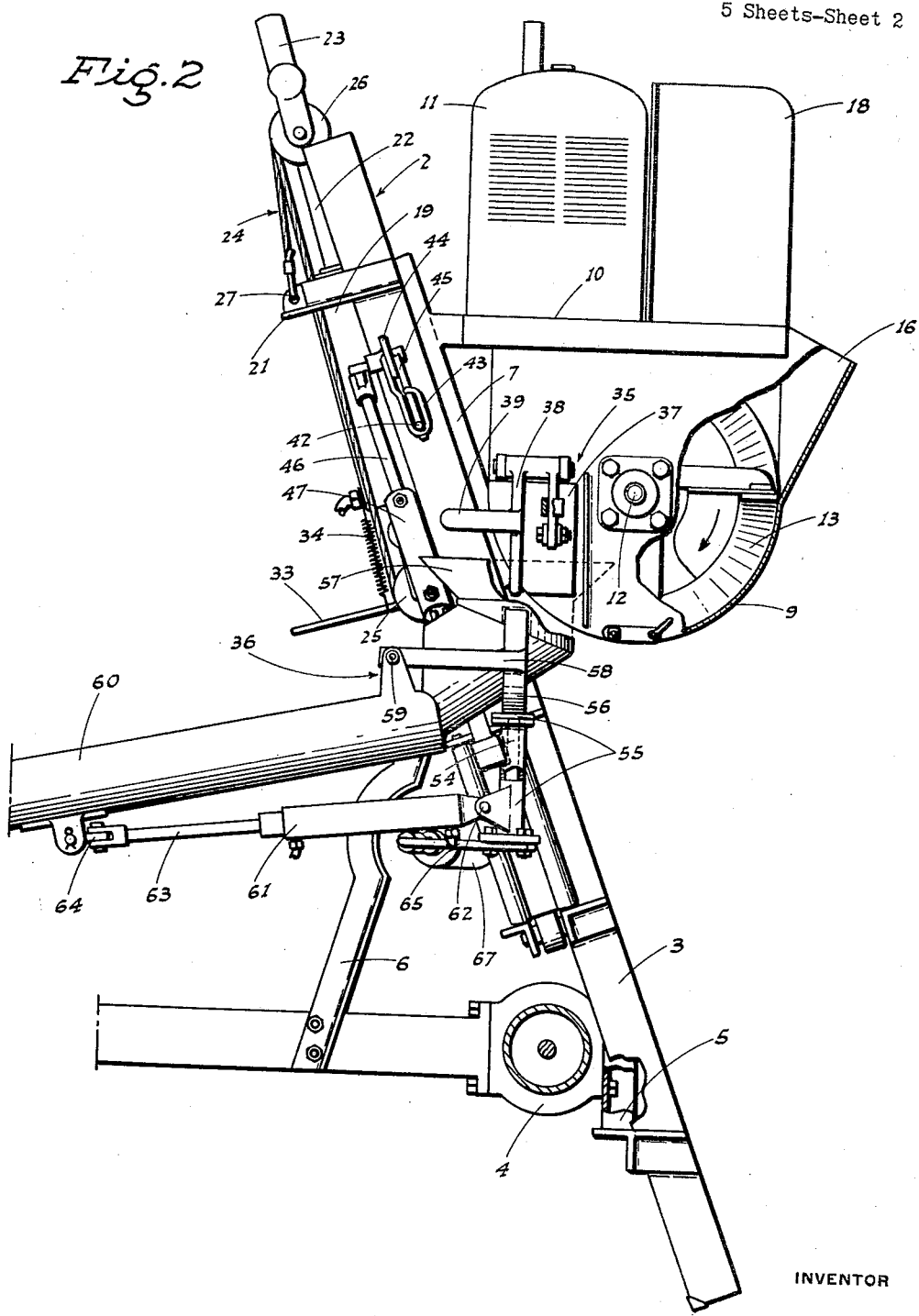
Fig. 4 is a front elevation of the device, detached from the tractor, and with certain parts broken away and others in section; the carriage and hopper being adjacent but short of its fully raised position.

Upon opening of the door 37 the mix, as fed from the hopper 9 by rotary auger 13, discharges downwardly into the adjustable chute assembly 36; the latter being constructed as follows:

On the front side and below the cross bar 32 the elevator frame 2 is fitted with a horizontal, transverse slide frame 48 supported by suitable anti-friction means, as shown, for transverse sliding motion from a retracted position, as in Fig. 7, to a laterally advanced position, as in Fig. 4; the advance being to the right when the device is viewed rearwardly from the front.

A tension spring 49 tends to return the transverse slide frame 48 to its retracted position, while lateral advance of said slide frame is accomplished through the medium of a horizontal, transverse power cylinder 50 mounted in connection with the elevator frame 2, and having a laterally extending piston rod 51 which engages an upstanding abutment 52 on the slide frame 48.

Such transverse slide frame 48 includes a laterally outwardly projecting arm 53 which extends in the direction of advance. At its outer end the arm 53 is fitted with a vertical axis bearing 54 which carries a turnable mount 55 having parts extending both above and below said bearing 54. At its upper end the turnable mount 55 is fitted with a cradle 56, which cradle is connected with and supports a wide-mouthed spout 57.

A pair of horizontal, transversely spaced arms 58 are fixed to the cradle 56 on opposite sides and project therefrom; the outer ends of said arms pivotally supporting, as at 59, the inner end of an elongated, trough-type, mix feeding chute 60. The spout 57 delivers into the chute 60 in the manner shown.

The chute 60 is vertically adjustably supported from below by means of a power cylinder 61 pivoted, as at 62, to the turnable mount 55 adjacent its lower end. A piston rod 63 projects outwardly from the power cylinder 61, and is swivelly connected, as at 64, to the under side of the chute 60. By extension or contraction of the power cylinder 61, the chute 60 is caused to raise or lower, as working conditions require.

By reason of the described mounting of the spout 57 and chute 60, the chute assembly 36 is swingably adjustable to project laterally from the tractor 1 at a desired angle; such swinging adjustment of the chute assembly 36 being accomplished as follows:

At its lower end the turnable mount 55 is fitted with a radial arm 65, whose outer end is pivotally connected with the adjacent end of a piston rod 66 which extends from a transverse, fluid pressure actuated power cylinder 67 whose inner end is attached to the slide frame 48.

Figure 7:
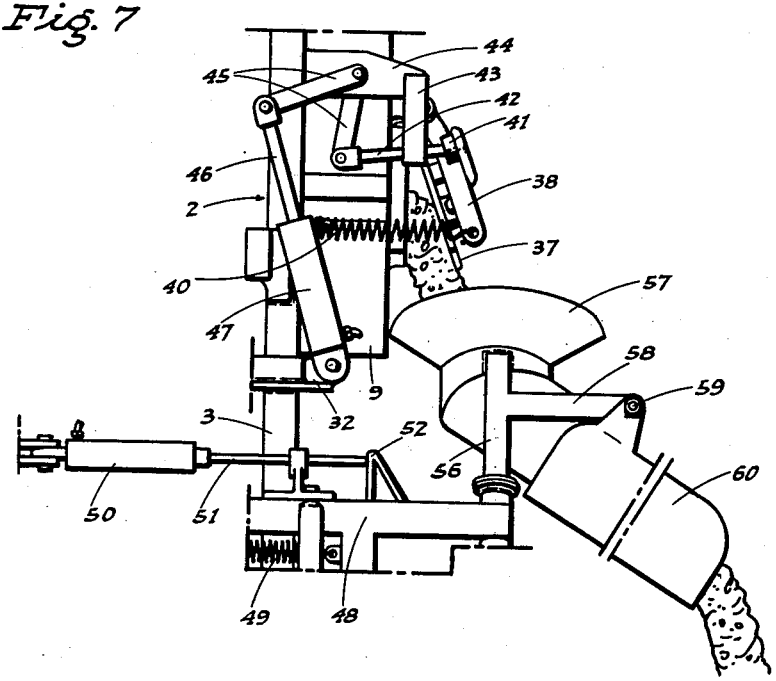
Fig. 7 is a fragmentary front end elevation of the device showing mainly the hopper in its raised position, and with the hopper door open and feeding to the spout; the chute being shown foreshortened and adjusted to a laterally projecting position.
Figure 8:
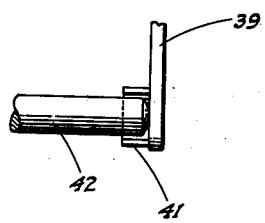
Fig. 8 is an enlarged fragmentary plan view showing the push rod and seat assembly of the hopper door-opening mechanism.

The chute 60, when not in use, lies lengthwise of the tractor 1 closely alongside the same, as in Fig. 1, but when in use said chute occupies a selected laterally projecting position controlled by the power cylinder 67; outward projection or extension of the piston rod 66 working the radial arm 65 so as to turn the mount 55 and the chute 60 to the desired position, as—for example—the position shown in Fig. 7.

Each time that the elevator carriage 7 and hopper 9 raises or lowers on the elevator frame 2, it is necessary to shift the chute assembly 36 at its inner end—i. e. the spout 57—laterally outwardly to a clearance position, as otherwise such spout would be in an obstructing position. Therefore, each time before the elevator carriage 7 and the hopper 9 raises or lowers on the elevator frame 2 the power cylinder 50 is extended, so that the piston rod 51 pushes on the abutment 52 and shifts the slide frame 48 laterally outward until the spout 57 is in a clearance position, as in Fig. 4.

With the elevator carriage 7 and hopper 9 in its raised unloading position—supported by the catch bar 30, and with the door 37 opened by the power cylinder 47— the mix discharges through such door, is received by the spout 57, and flows into and down the chute 60; the latter having previously been adjusted to selected elevation by the power cylinder 61, and to a predetermined position of lateral projection from the tractor 1, by the power cylinder 67.

From the chute 60 the mix discharges downwardly into the form, which form may be of the type used in a trench for producing in-place concrete pipe in the latter. For this type of use the tractor 1 is disposed lengthwise of the trench adjacent the same, with the discharge end of the spout 60 overhanging such trench and the form therein.

It will thus be recognized that the described concrete mix carrier and feeder, as mounted on a tractor, provides for the convenient, efficient, and ready transport of mix from a mixer at one point to a form located at another point; the device permitting of the discharge of the mix from the chute at a selected elevation and predetermined point laterally of said tractor.

The several power cylinders which the device embodies are controlled by the operator from the tractor seat 34 by means of a bank of cylinder control valves, which bank is indicated generally at 68. If desired, the power cylinder 50 which controls the shifting of the chute assembly 36 to an outward or clearance position, as required during up and down travel of the carriage 7 and hopper 9, may be connected into the valve regulated conduit system which controls the power cylinder 19.

The power cylinder 50, being smaller in diameter than the power cylinder 19, will work first, followed by said cylinder 19; the result being that the chute assembly 36 will thus automatically be moved laterally outwardly to its clearance position before the power cylinder 19 works to control raising or lowering of the carriage 7 and hopper 9.

For the purpose of clarity, the valve regulated conduit systems for the power cylinders of the device are omitted from the drawings.

From the foregoing description it will be readily seen that there has been produced such a device as subtantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tractor-mounted concrete-mix carrier and feeder comprising an elevator frame adapted to be secured on a tractor, an elevator carriage movable up and down the elevator frame, a mix hopper secured on the carriage and movable from adjacent the ground to a predetermined raised position above ground, a door on the hopper at one end thereof, a chute assembly including a spout adapted to transversely aline with the door when the hopper is raised to said position, and means mounting the chute assembly at the spout end on the elevator frame for lateral shifting movement and at a fixed level below that of said raised position of the hopper whereby the chute assembly may be shifted laterally out from under the door end of the hopper to allow of the lowering of the latter from above the chute spout.

2. A structure, as in claim 1, in which said mounting means includes a frame extending transversely of the elevator frame and on one end of which the chute assembly is supported, and supporting and guide means on the elevator frame for said transverse frame; there being power means between the frames to shift the transverse frame.

3. A tractor-mounted concrete-mix carrier and feeder comprising an elevator frame adapted to be secured on a tractor, an elevator carriage movable up and down the elevator frame, a chute assembly including a mix receiving spout mounted at the spout end on the elevator frame at a fixed predetermined level above ground, a mix hopper having a normally closed door in one end secured on the carriage and movable up and down the elevator frame from adjacent ground level to a raised position a predetermined distance above the spout and in position to enable the hopper to discharge into the spout from the door when the latter is open, manually controlled power means on the elevator frame to open the door, and cooperating means between the door and power means to allow the latter to open the door only when the hopper reaches such raised position.

4. A structure, as in claim 3, in which said power means includes a longitudinally movable normally retracted plunger free at its outer end, and extending away from the direction of opening movement of the door, and said cooperating means including a rigid finger projecting from the door in front of the free end of the plunger when the hopper is disposed in said raised position, and a seat element on the finger then receiving said free end of the plunger from below in locating relation.

References Cited in the file of this patent
UNITED STATES PATENTS

| | | |
|---|---|---|
| 248,140 | Chamberlain et al. | Oct. 11, 1881 |
| 1,198,530 | Droughton | Sept. 19, 1916 |
| 1,385,849 | Sturtevant | July 26, 1921 |
| 1,588,997 | Schmid et al. | June 15, 1926 |
| 2,142,588 | Medley et al. | Jan. 3, 1939 |
| 2,455,432 | Martin | Dec. 7, 1948 |
| 2,612,250 | Sarosdy | Sept. 30, 1952 |